United States Patent [19]
Graf et al.

[11] 3,775,651
[45] Nov. 27, 1973

[54] POWER SYSTEM OVERCURRENT PROTECTION MEANS UTILIZING VOLTAGE ADJUSTMENT

[75] Inventors: Carlton Eugene Graf; Einar Aasen Skogsholm; John Gaylor Tracy, all of Erie, Pa.

[73] Assignee: General Electric Company, Erie, Pa.

[22] Filed: Dec. 17, 1971

[21] Appl. No.: 209,463

[52] U.S. Cl. .................................. 318/227, 318/230
[51] Int. Cl. ............................................. H02p 5/40
[58] Field of Search .................... 318/227, 230, 231

[56] References Cited
UNITED STATES PATENTS

| | | | |
|---|---|---|---|
| 3,619,749 | 11/1971 | Schieman | 318/227 |
| 3,543,083 | 7/1971 | Blashke | 318/227 |
| 3,577,052 | 5/1971 | Bauer | 318/227 |
| 3,500,158 | 3/1970 | Landau et al. | 318/227 |

Primary Examiner—Gene Z. Rubinson
Attorney—James C. Davis, Jr. et al.

[57] ABSTRACT

The actual electric current transmitted between a source of variable voltage electric power and an electric motor connected thereto is continuously monitored and utilized to generate a first control signal in response to a motoring current equal to or greater than a predetermined level and a second control signal in response to a regenerative current equal to or greater than a predetermined level. A regulator is responsive to the first control signal to reduce the output voltage of the electric power source and to the second control signal to increase the output voltage of the power source, the result being a rapid reduction in the actual current.

17 Claims, 3 Drawing Figures

INVENTORS
CARLTON E. GRAF
EINAR A. SKOGSHOLM
JOHN G. TRACY

BY George R. Powers
THEIR ATTORNEY

POWER SYSTEM OVERCURRENT PROTECTION MEANS UTILIZING VOLTAGE ADJUSTMENT

BACKGROUND OF THE INVENTION

1. Field of the Invention

This invention relates to electrical power systems for supplying electric power to electric motors, and, more particularly, to protection against destructive overcurrent conditions in such electrical systems.

2. Description of the Prior Art

This invention is particularly applicable to the control of variable frequency a-c drive systems of the general type disclosed and claimed in U.S. Pat. No. 3,694,718, entitled "Methods of Inverter Voltage Control by Superimposed Chopping," filed on Oct. 19, 1970, in the names of Carlton E. Graf and Werner K. Volkmann, and by the now abandoned Pat. application Ser. No. 81,757, entitled "Synchronous Time Ratio Control Power Regulator," filed on Oct. 19, 1970, in the name of Carlton E. Graf, both applications being assigned to the assignee of this invention. While the present invention will be described herein in connection with an adjustable speed drive system of the type taught by the aforesaid patent applications to the extent necessary for a full and complete understanding of the invention, a more complete understanding of such inverter circuits may be obtained from the aforesaid patent applications.

Variable speed operation of polyphase a-c motors can be accomplished by providing an adjustable frequency polyphase voltage to such motors. Under such circumstances, the average voltage applied to the motor is advantageously correspondingly varied to provide a substantially constant voltage-to-frequency ratio. The aforesaid patent applications relate to adjustable speed drive systems in which variable voltage polyphase electric power is supplied in this manner to drive a polyphase a-c motor.

In adjustable speed drive systems of the type disclosed and claimed by the aforesaid patent applications and in electrical drive systems generally, various system components including motors must be protected against destructive overcurrent conditions during motoring and regenerative modes of operation. In accordance with U.S. Pat. No. 3,719,873, entitled "Current Limiting Control For An Electric Power System" filed on June 15, 1971, and issued Mar. 6, 1973, in the name of Carlton E. Graf and assigned to the assignee of this invention, means have been provided for sensing certain overcurrent conditions and automatically taking in response thereto certain corrective actions to reduce current while permitting the continuation of inverter operation. More particularly, the aforesaid U.S. Pat. No. 3,719,873 teaches means for adjusting both the output frequency and voltage of an inverter when the in-phase current component reaches a predetermined level, such as 150 percent of rated current. Under certain conditions, however, the actual current level may become sufficiently large that more drastic current reduction measures are called for, or the actual current may be sufficiently out-of-phase that the in-phase component of actual current fails to give a reasonable indication of the actual current level. Under these conditions, it is desirable that means be provided for taking rapid action to reduce the actual current to a safe level. More particularly, it is desirable that means be provided for automatically reducing the power system voltage to its minimum level in response to an overcurrent condition during motoring and for automatically increasing the power system voltage to its maximum level in response to an overcurrent condition during regenerative operation.

SUMMARY OF THE INVENTION

Accordingly, it is a primary object of this invention to provide improved means for sensing actual current in an electrical power system and automatically changing the output voltage of the power system in the appropriate direction to either its maximum or minimum level.

Another object is to sense actual current in an electrical power system and to reduce the current by reducing the output voltage of the power system to its minimum level when the overcurrent condition occurs during motoring and by increasing the output voltage to its maximum level when the overcurrent condition occurs during regeneration.

Briefly stated, in carrying out the invention in one form, an electrical power system capable of supplying electric power to an a-c or d-c motor throughout a voltage range bounded by maximum and minimum voltage levels includes means for automatically adjusting the output voltage in response to an overcurrent condition. In accordance with the invention, control apparatus is provided for generating a first control signal when a motoring overcurrent is encountered and a second control signal when a regenerative overcurrent is encountered. The regulator, which normally maintains the output voltage of the power at some selected level within the total voltage range, responds to the first control signal by reducing the output voltage of the power source to its minimum level for the duration of the first control signal, and the regulator responds to the second control signal by increasing the output voltage to its maximum level for the duration of the second control signal. The control apparatus includes means for generating a current signal proportional to the actual current transmitted between the power source and the electric motor, means for generating a continuous signal having distinct signal levels for continuously indicating the polarity of the output voltage, and a control signal generator for producing the first and second control signals in response to appropriate combinations of the current and voltage signals. By a further aspect of the invention, the power source is a polyphase inverter and the motor is a polyphase motor, the regulator controlling both the fundamental output frequency and the output voltage of the inverter.

By a still further aspect of the invention, the control signal generator includes a plurality of overcurrent signal generators each associated with a respective output phase for generating a first overcurrent signal when the actual current is equal to or greater than a fixed positive level and a second overcurrent signal when the actual current is equal to or less than a fixed negative level. Each over-current signal generator has a respective first gating means coupled thereto for receiving first and second overcurrent signals therefrom, each of the first gating means also being coupled to the voltage signal generating means for receiving therefrom at least one voltage signal in phase with the respective output phase of the power system. The first gating means produces a first output signal when the overcurrent and voltage signals are consistent with a motoring overcurrent in the respective phase and a second output signal when the overcurrent and voltage signals are consistent with regenerative operation. The control signal generator further includes a second gating means coupled to each of the first gating means for producing a first control signal in response to one or more first output signals and for producing a second control signal in response to one or more second output signals in the absence of a first output signal.

BRIEF DESCRIPTION OF THE DRAWINGS

While the novel features of this invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
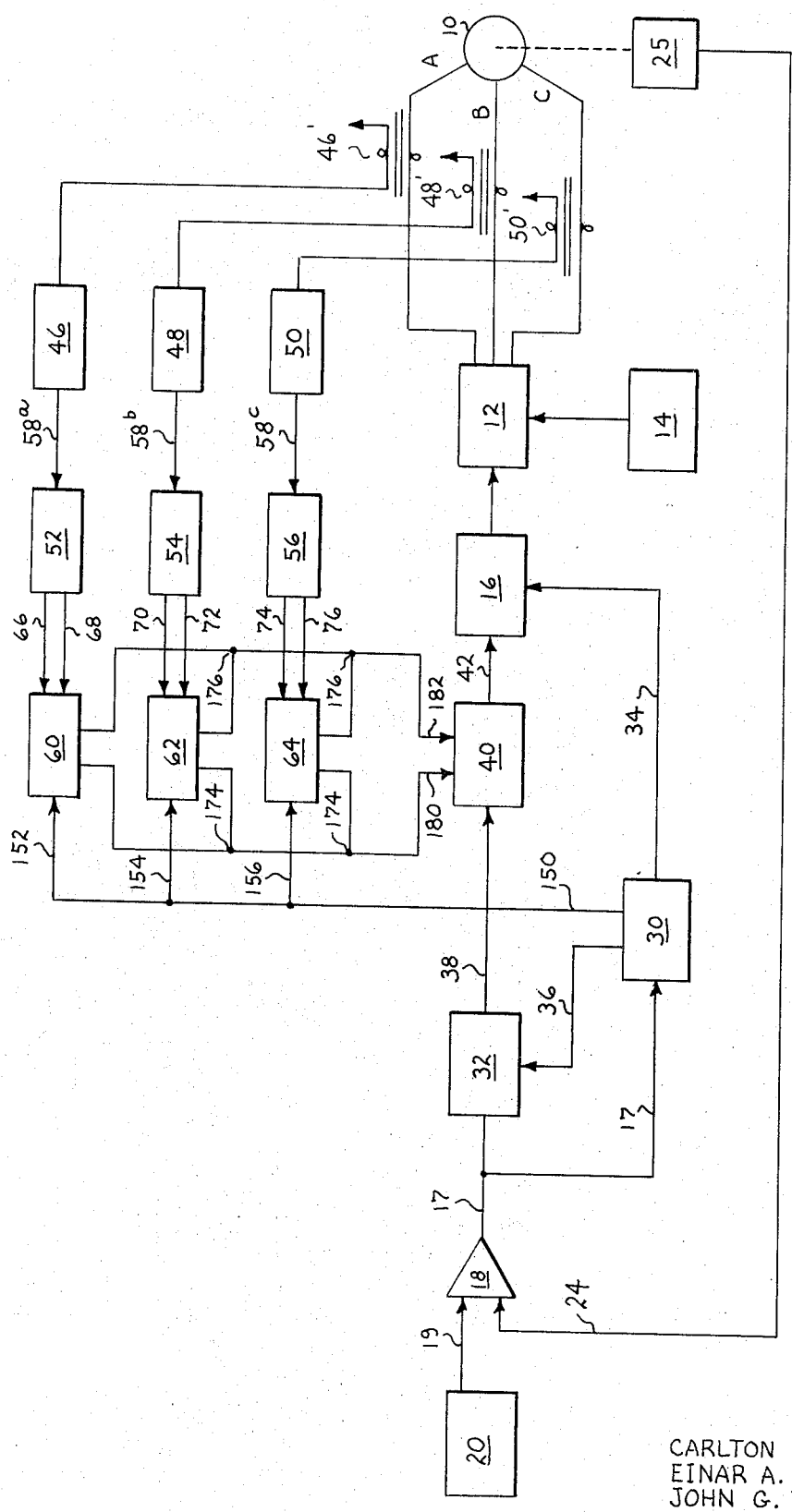
FIG. 1 is a block diagram of an a-c drive system including the overcurrent protection means of this invention.

Referring first to FIG. 1, an a-c drive system of the type disclosed by the aforesaid patent applications is illustrated in block diagram form. More particularly, the drive system as illustrated includes a three phase a-c induction motor 10 supplied with variable frequency, variable voltage electric power from power conversion apparatus 12 over phase conductors A, B and C. The power conversion apparatus 12 preferably comprises inverter circuitry for transforming direct current electric power from a d-c source 14 to polyphase variable frequency, variable voltage a-c electric power. As taught by the aforesaid patent applications, the inverter circuitry of the power conversion equipment 12 includes gate controlled rectifying devices such as silicon controlled rectifiers (SCR's) or gaseous thyratrons which conduct in a predetermined sequence and for time periods determined by gate firing pulses supplied to the controlled rectifiers from a regulating means 16. A clear understanding of the basic principles of operation of the inverter 12 and its regulator 16 may be obtained from the aforesaid U.S. Pat. No. 3,694,718 and application Ser. No. 81,757. However, before proceeding to a detailed description of the present invention, it should be noted that overcurrent conditions can occur under many circumstances and in many power systems. Accordingly, it will be appreciated as this description proceeds that the current protection means of this invention has much broader application than in the specific a-c drive application illustrated by FIG. 1. Specifically, the invention in its broader aspects may be used for controlling overcurrent conditions in d-c as well as a-c drive systems.

Referring now to the illustrated a-c drive system of FIG. 1, the regulator 16 normally produces firing pulses in a prescribed sequence at a rate determined by the magnitude and polarity of a signal 17 supplied from primary control apparatus 18. The control apparatus 18 produces the signal 17 in response to various input signals which include a reference signal 19 from a source 20 indicating a desired level of motor operation and one or more feedback signals such as a speed signal 24 supplied from a motor driven tachometer 25. Signals indicative of various other operating parameters may also be supplied to the control apparatus 18. The function of the control apparatus 18 is to produce, in response to the reference signal from the source 20 and any other input signals, a control signal 17 which will ultimately cause the regulator 16 to supply gate firing pulses such that the actual output is at the level called for by the reference signal 19. However, when an overcurrent control signal is being generated in accordance with this invention, the signal 17 is effective only to control the fundamental frequency. In other words, an over-current control signal operates to override the signal 17 and make appropriate changes in the output voltage of the power conversion apparatus 12. The manner by which this is accomplished will become clear as this description proceeds.

Before turning attention to the overcurrent protection means of this invention, the manner by which the signal 17 is normally processed to control the rate at which firing pulses are produced by the regulator 16 will be reviewed briefly. The apparatus utilized in processing the signal 17 is illustrated by blocks 30 and 32 of FIG. 1 and is described in detail in the aforesaid U.S. Pat. No. 3,694,718 and application Ser. No. 81,757. Briefly stated, block 30 is a frequency generator which establishes both the fundamental frequency of output power from the inverter 12 (and hence the speed of the motor 10) and a chopping frequency. Block 32 is a time-ratio-control regulating circuit for determining the output voltage level of the inverter 12 by determining the relative "on" and "off" times of the inverter rectifiers. As taught by the aforesaid patent applications, the frequency generator 30 includes a three phase generator which establishes in response to signal 17 phase signals establishing the fundamental frequency of each of the output phases A, B and C, these phase signals being supplied to the regulator 16 over composite conductor 34. The frequency generator 30 also establishes a chopping frequency in accordance with the signal 17, and this frequency is transmitted to the time-ratio-control regulator 32 over conductor 36. The time-ratio-control regulator 32 is responsive to the signal 17 and the chopping frequency to generate and transmit on conductor 38 a signal having HIGH and LOW logic levels. This chopping signal on conductor 38 is supplied to block 40, which comprises a gating or logic network arranged such that the chopping signal is transmitted therethrough without modification during normal inverter operation within an acceptable current range. The logic network 40 will be described in detail as this description proceeds. Within the fundamental frequency established by the frequency generator 30, the output voltage of the inverter 12 will be at the maximum level permitted by the d-c supply 14 when the chopping signal has a selected one of the two logic levels and at the minimum level when the chopping signal has the other one of the two logic levels. In the illustrated embodiment, the inverter output voltage is at its maximum level when the signal on conductor 38 is LOW and at its minimum level when the signal on conductor 38 is HIGH.

Turning attention now to the present invention, means are provided for blocking the signal on conductor 3 and supplying on conductor 42 a first control signal having the HIGH, minimum voltage, logic level when a motoring overcurrent is present and a second control signal having the LOW, maximum voltage, logic level when a regenerative overcurrent is present. The regulator 16 responds to a first control signal to reduce the output voltage of the inverter 12 to the minimum level throughout the duration of the first control signal so as to thereby reduce the motoring overcurrent by reducing the voltage applied to the motor terminals, and the regulator 16 responds to a second control signal to increase the output voltage of the inverter 12 to the maximum level throughout the duration of the second control signal so as to thereby reduce the regenerative overcurrent by increasing the voltage applied to the motor terminals. The manner by which this is accomplished will now be described.

Figure 2:
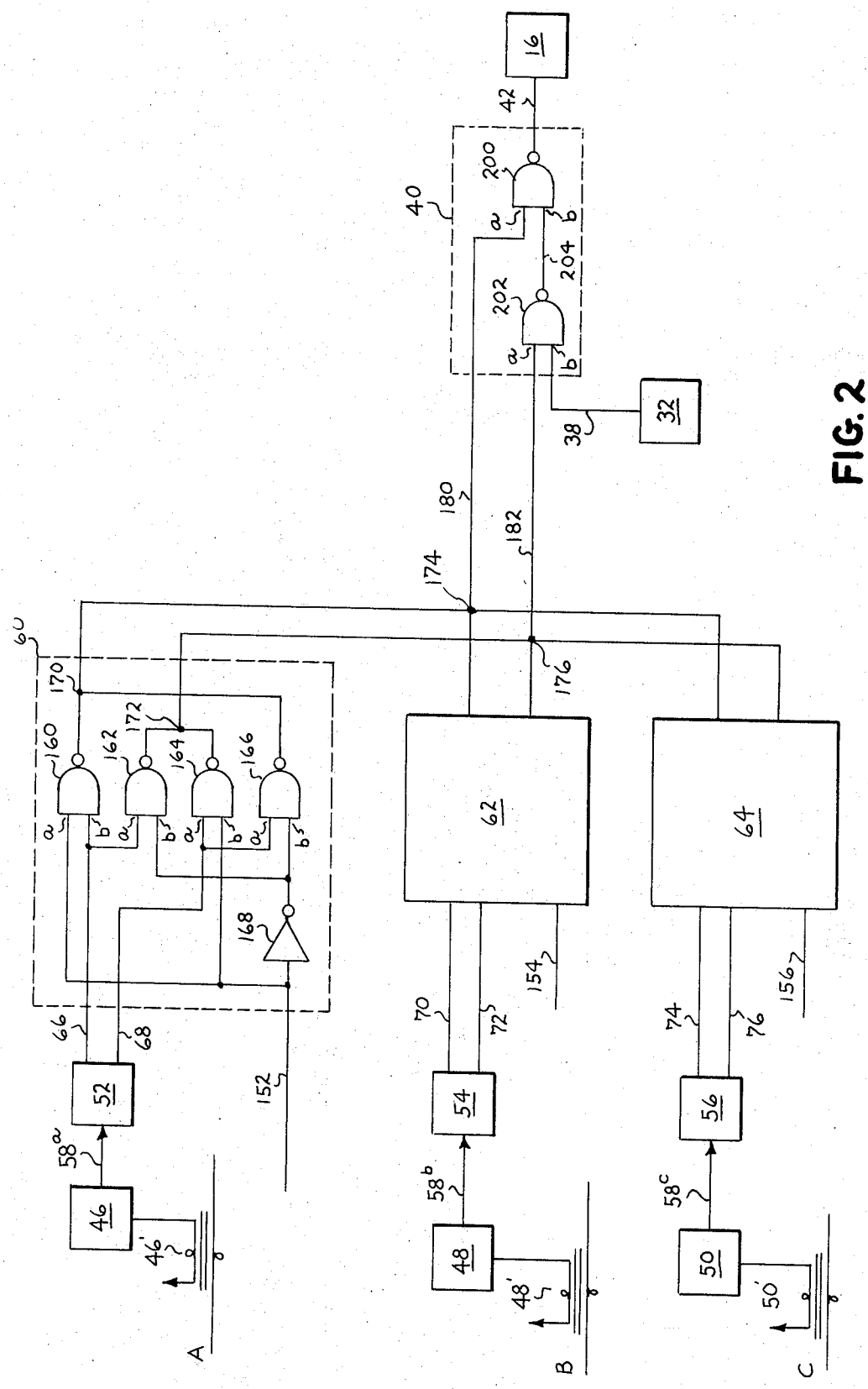
FIG. 2 is a block diagram of the control signal generating means illustrating in detail the first and second logic networks.
Figure 3:
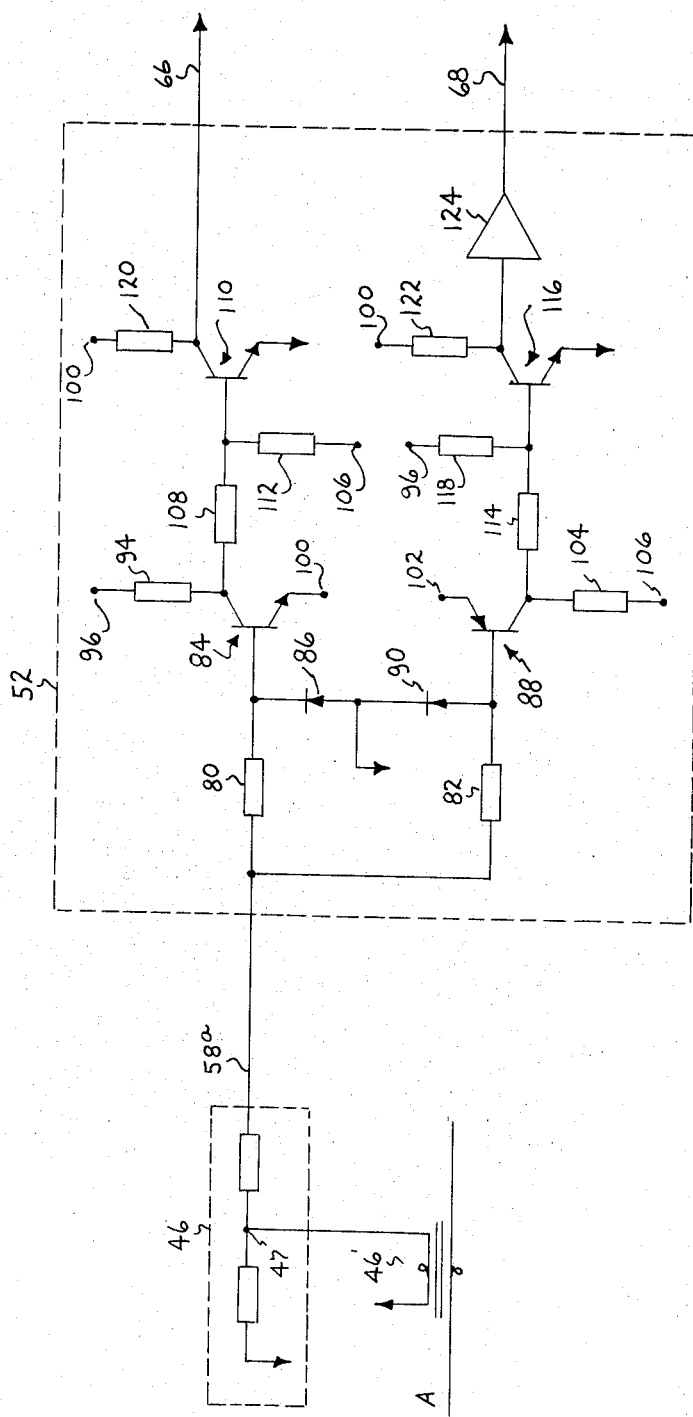
FIG. 3 is a circuit diagram of a current signal generator of one of the output phases of the drive system of FIG. 1 along with the associated overcurrent signal generator.

As best illustrated by FIGS. 2 and 3, current sensing circuits 46, 48 and 50 are coupled by respective secondary transformer coils 46', 48' and 50' with the conductors supplying current to phases A, B and C, respectively, of the motor 10. Current flow proportional to the actual phase current is generated in the secondary of each transformer, and a signal proportional to the actual current is supplied from the respective current sensing circuit to a respective one of three over-current signal generators 52, 54 and 56. More particularly, as best shown by FIG. 3, a current signal proportional at all times to the actual current flow in phase A is supplied to the overcurrent signal generator 52 from junction 47 of circuit 46 over conductor 58a. Referring now to FIGS. 1 and 2, a similar signal proportional to the actual current in phase B is supplied over conductor 58b to the over-current signal generator 54, and a similar signal proportional to the actual current in phase C is supplied over conductor 58c to the over-current signal generator 56.

Each of the overcurrent signal generators 52, 54 and 56 has a pair of output conductors coupled to a respective gating or logic network 60, 62 and 64. More particularly, overcurrent signal generator 52 has output conductors 66 and 68 coupled to logic network 60, overcurrent signal generator 54 has output conductors 70 and 72 coupled to logic network 62, and overcurrent signal generator 56 has output conductors 74 and 76 coupled to logic network 64. During normal power system operation within the normal current range, the output conductors 66, 68, 70, 72, 74 and 76 all carry signals at a LOW logic level. The overcurrent signal generators 52, 54 and 56 are identical in structure and operation, and for this reason only the overcurrent signal generator 52 will be described in detail.

As shown by FIG. 3, the overcurrent signal generator includes a pair of input resistors 80 and 82 connected to conductor 58. The base of an NPN transistor 84 is connected to resistor 80 and the cathode of a diode 86, the anode of the diode 86 being connected to common. The base of a PNP transistor 84 is conected to resistor 82 and the anode of a diode 90, the cathode of the diode 90 being connected to common. The collector of the transistor 84 is connected through a resistor 94 to a source 96 of potential positive with respect to common, and the emitter is connected to source 100 of lower positive potential. Similarly, the emitter of the transistor 88 is connected to a source 102 of potential negative with respect to common, and the collector of the transistor 88 is connected through a resistor 104 to a source 16 of lower negative potential. The collector of the transistor 84 is also coupled through a resistor 108 to the base of an NPN transistor 110 and through an additional resistor 112 to the source 106 of negative potential. Similarly, the collector of the transistor 88 is connected through a resistor 114 to the base of an NPN transistor 116 and through an additional resistor 118 to the source 96 of positive potential. The collectors of the transistors 110 and 116 are connected, respectively, through resistors 120 and 122 to the source 100 of positive potential, and the emitters of the transistors 110 and 116 are connected directly to common. Output conductor 66 is connected to the collector of transistor 110, and the collector of the transistor 116 is connected through an inverting element 124 to output conductor 68.

The voltages of the d-c sources 96, 100, 102 and 106 and the elements comprising the overcurrent signal generator 52 are selected such that the transistor 110 conducts and the transistor 116 does not conduct so long as the actual current in phase A is within a predetermined acceptable range. If, however, the actual current rises at any time to a predetermined positive level, say 200 percent of rated current, transistor 110 will stop conducting and the signal on conductor 66 will increase from its previous LOW level (essentially common) to a HIGH level. Similarly, if the actual current reaches a predetermined negative level, say 200 percent of rated current, transistor 116 will begin to conduct, and the voltage at its collector will drop essentially to that of common. This LOW signal will result in a HIGH signal on conductor 68. Thus, it will be appreciated that the overcurrent signal generator 52 has LOW signals on output conductors 66 and 68 so long as the actual current in phase A is within the acceptable range. A HIGH overcurrent signal will be produced on conductor 66 in the event of a positive overcurrent, and a HIGH overcurrent signal will be produced on conductor 68 in the event of a negative overcurrent.

By way of further explanation as to the operation of the overcurrent signal generator 52, a current signal on conductor 58 less than that corresponding to the predetermined positive overcurrent is insufficient to turn on transistor 84. The resistors 94, 108 and 112 are selected such that the voltage applied to the base of transistor 110 is sufficient to turn on the transistor 110 when the transistor 84 is turned off, but not sufficient to turn on transistor 110 when transistor 84 is turned on. Accordingly, a LOW signal is present under normal operating conditions on conductor 66. If, however, the current signal reaches a level equal to or greater than the predetermined positive overcurrent level, the base voltage on transistor 84 will rise to a level sufficient to turn on the transistor, and this will in turn drop the voltage on the base of transistor 110 sufficiently to turn off transistor 110 and thereby produce a HIGH positive overcurrent signal on conductor 66. In a similar manner, the resistors 104, 114 and 118 are selected such that transistor 116 conducts only when transistor 88 conducts. Since transistor 88 conducts only when the current signal on conductor 58 has a negative value corresponding to an actual curent equal to or less than (greater magnitude) the predetermined negative overcurrent level, a HIGH negative overcurrent signal will be present on conductor 68 only when both transistors 88 and 116 are conducting.

The operation of the logic networks 60, 62, and 64 will now be described with particular reference to FIG. 2. Since the networks 60, 62 and 64 are identical in structure and mode of operation, only network 60 will be described in detail. As shown, the network 60 is connected to the overcurrent signal generator 52 for receiving LOW and HIGH signals on conductors 66 and 68 therefrom and to the frequency generator 30 (FIG. 1) for receiving therefrom on composite conductor 150 and conductor 152 a square wave phase signal in phase with the fundamental frequency of inverter output phase A. Similar phase signals in phase with output phases B and C are supplied to logic networks 62 and 64 on conductors 154 and 156, respectively. The signal on conductor 152 has a HIGH logic level when the phase A output voltage is in its positive half cycle and a LOW logic level when the phase A output voltage is in its negative half cycle. The logic network 60 comprises a plurality of logic elements or gates 160, 162, 164 and 166 of the NAND-NOR type. A NAND-NOR gate is one in which a HIGH output signal is generated whenever at least one input signal is LOW and in which a LOW output signal will be produced whenever all input signals are HIGH. When the outputs of a number of NAND-NOR gates are interconnected, a LOW output signal from any one of the gates will override any number of HIGH output signals. The gates all have two inputs, the conductor 66 being connected to first inputs a of gates 160 and 162 and the conductor 68 being connected to first inputs a of gates 164 and 166. Conductor 152 is connected directly to the second inputs b of gates 160 and 164 and is connected through an inverting element 168 to the second inputs b of gates 162 and 166.

Let it now be assumed that neither a positive nor a negative overcurrent condition exists in phase A. This means that LOW signals are present on conductors 66 and 68 and, therefore, that at least one LOW signal is supplied to each of the gates 160, 162, 164 and 166. Accordingly, HIGH level signals are present at junctions 170 and 172. Assuming that similar conditions exist in phases B and C, HIGH signals will be present at junctions 174 and 176 and will be supplied therefrom on conductors 180 and 182, respectively, to the logic network 40. However, now let it be assumed that a positive overcurrent is detected during the positive half cycle. This means that a HIGH signal will be supplied to the first inputs a of gates 160 and 162 simultaneously with a HIGH signal at the second inputs b of gates 160 and 164 (LOW signals will be supplied to the second inputs b of gates 162 and 166 due to the inverting element 188). As a result of the two HIGH signals supplied to gate 160, a LOW output signal will be present at junctions 170 and 174, this LOW signal being supplied therefrom to the logic network 40 over conductor 180. If a positive overcurrent is detected during the negative half cycle, HIGH signals supplied to both inputs of gate 162 will produce a LOW signal at junctions 172 and 176, from which the LOW signal will be supplied to the logic network 40 over conductor 182. Similarly, a negative overcurrent, represented by a HIGH signal on conductor 68, during the positive half cycle, will result in the supply of two HIGH inputs to gate 164 and a LOW signal at junction 172 and 176. A negative overcurrent during the negative half cycle will result in the generation of a LOW output signal by gate 166, from which the LOW signal will be transmitted to junctions 170 and 174 and to the logic networks.

It will be appreciated from the foregoing description that a LOW signal is produced at junction 174 only when the sensed current in at least one phase relative to the existing inverter voltage of that phase is consistent with motoring operation. Similarly, the generation of a LOW signal at junction 176 is consistent only with regenerative operation. It will thus be appreciated that the logic or gating networks 60, 62 and 64 provide a first distinct output signal when a motoring overcurrent is detected in one or more of the phases and a second distinct output signal when a regenerative overcurrent is detected in one or more of the phases.

Referring now to FIGS. 1 and 2, the logic network 40 and its mode of operation will be described. The logic network 40 includes a pair of NAND-NOR gates 200 and 202, the first input a of gate 200 being connected to conductor 180 and junction 174 and the first input a of gate 202 being connected to conductor 182 and junction 176. The second input b of gate 202 is connected to conductor 38 from the time-ratio-control regulating apparatus 32, and the output of gate 202 is connected by conductor 204 to the second input b of gate 200. The output of gate 200 is connected to the regulator 16 by the conductor 42.

Let it now be assumed that the power system is operating within the normal current range. Under this condition, HIGH signals are supplied to the first inputs a of gates 200 and 202. As previously explained, a chopping signal having alternating LOW and HIGH logic levels calling, respectively, for maximum and minimum voltage output are supplied to the logic network 40 on conductor 38. A LOW signal at the second input b of gate 202 will produce a HIGH signal at its output. The resulting pair of HIGH signals to gate 200 will produce a LOW signal on conductor 42 and the regulator 16 will respond by increasing the output voltage of the inverter 12 to essentially its maximum level for the duration of the LOW signal on conductor 38. Similarly, a HIGH signal on conductor 38 will produce a LOW output signal from gate 202 and a HIGH output signal from gate 200. The regulator 16 responds to a HIGH signal on conductor 42 by reducing the voltage of the inverter 12 to its minimum level. It will thus be seen that the logic network 40 merely passes the signal on conductor 38 to conductor 42 during operation of the power system within the normal current range.

However, let it now be assumed that a motoring overcurrent condition exists in at least one of the phases, the motoring overcurrent being indicated by a LOW signal supplied to the first input a of gate 200. The gate 200 will respond to a LOW signal at its input a by generating and maintaining a HIGH output signal so long as the motoring overcurrent persists. In response to the resulting HIGH signal on conductor 42, the regulator 16 causes the voltage of the inverter 12 to be reduced to its minimum level and maintained at that level throughout the period of the motoring overcurrent. Furthermore, the signal produced by gate 200 is entirely independent of the signal supplied to its second input b so long as the LOW signal is present at the first input a.

Let it now be assumed that a regenerative overcurrent condition exists in at least one of the phases and is indicated by a LOW signal supplied to the first input a of gate 202. In this case, gate 202 will produce a HIGH output signal, and gate 200 will respond to the resulting pair of HIGH input signals to produce a LOW output signal. As a result, the output voltage of the inverter 12 will be increased to essentially its maximum level so long as the LOW signal persists at the input a of gate 202. Of course, if due to a falut in the system LOW signals should simultaneously be supplied to the first inputs a of gates 200 and 202, the motoring overcurrent signal supplied to gate 200 will have priority and the inverter voltage will be reduced.

From the foregoing, it will be seen that this invention provides effective means for sensing actual current in a drive system and responding to a motoring overcurrent condition by reducing the power system output voltage to its minimum level and to a regenerative overcurrent condition by increasing the power system output voltage to its maximum level.

Although this invention has been described in connection with a preferred embodiment, it will occur to those skilled in the art that many modifications and variations are possible without departing from the spirit and scope of the invention. For example, various signal levels and polarities have been assumed in the description contained herein. These can be changed along with appropriate compensating changes in the various circuits and logic networks. Furthermore, while the invention has been described herein in connection with an a-c drive system, it will be appreciated that the invention may be utilized advantageously in the control of overcurrent conditions not only in a-c drive systems, but also in d-c drive systems and other electrical systems. Accordingly, it is intended that these and other modifications of the invention be included within the scope of the invention.

What is claimed as new and is desired to secure by Letters Patent of the United States is:

1. A power system for reversibly transmitting variable voltage electric power to an electric motor, said power system comprising:
   a source of variable voltage electric power,
   regulating means coupled to said variable voltage source for controlling at least the voltage of the electric power transmitted between said variable voltage source and an electric motor connected thereto, the voltage being variable between minimum and maximum levels,
   current signal generating means coupled to sense actual current transmitted between said variable voltage source and an electric motor connected thereto and to generate a current signal proportional thereto,
   voltage signal generating means for generating a continuous voltage signal having distinct signal levels for instantaneously indicating the polarity of the actual output voltage of said variable voltage source,
   and control signal generating means coupled to said current signal generating means and said voltage signal generating means and being responsive to the current and voltage signals to generate a first control signal in response to a motoring current equal to or greater than a predetermined level and to generate a second control signal in response to a regenerative current equal to or greater than a predetermined level,
   said regulating means being coupled to said control signal generating means for receiving control signals therefrom, said regulating means being responsive to a first control signal to substantially instantaneously reduce the output voltage of said variable voltage source by a single step function to the minimum voltage level throughout the duration of the first control signal and being responsive to a second control signal to substantially instantaneously increase the output voltage of said variable voltage source by a single step function to the maximum voltage level throughout the duration of only the second control signal so as to thereby reduce the level of the actual current being transmitted between said variable voltage source and an electric motor connected thereto.

2. A power system as defined by claim 1 in which said source of variable voltage electric power is a static power inverter adapted to be coupled between a source of d-c electric power and an a-c motor and in which said regulating means controls the fundamental output frequency of said inverter as well as the output voltage.

3. A power system as defined by claim 2 in which said inverter is a polyphase inverter having a plurality of output phases for connection to the respective phases of a polyphase a-c motor, said current signal generating means being responsive to the actual current in each of said output phases and generating a respective plurality of current signals, said voltage signal generating means generating a plurality of voltage signals each in phase with the voltage of a respective one of said output phases, and said control signal generating means being responsive to the current and voltage signals to generate a first control signal in response to a motoring current in any one of said output phases which is equal to or greater than the predetermined level.

4. A power system as defined by claim 3 in which said control signal generating means is responsive to the current and voltage signals to generate a second control signal in response to a regenerative current in any one of said output phases which is equal to or greater than the predetermined level, said control signal generating means further comprising means responsive to the simultaneous generation of first and second control signals to respond to only the first control signal and thereby reduce the output voltage of each of said input phases.

5. A power system as defined by claim 3 in which said current signal generating means comprises a plurality of current sensing means each coupled to a respective one only of said inverter output pulses and generating a current signal proportional to the actual output current of the respective output phase, and in which said control signal generating means further comprises:
   a plurality of overcurrent signal generating means each coupled to a respective one only of said current signal generating means for generating a first over-current signal when the actual current is equal to or greater than a fixed positive level and a second overcurrent signal when the actual current is equal to or less than a fixed negative level,
   a plurality of first gating means each coupled to a respective one only of said overcurrent signal generating means for receiving first and second overcurrent signals therefrom and to said voltage signal generating means for receiving therefrom at least one voltage signal in phase with the respective output phase, each of said first gating means being responsive to the overcurrent and voltage signals supplied thereto to generate a first output signal only when the overcurrent and voltage signals are consistent with motoring operation and to generate a second output signal only when the overcurrent and voltage signals are consistent with regenerative operation, and second gating means having a first input coupled to each of said first gating means for receiving first output signals therefrom, a second input coupled to each of said first gating means for receiving second output signals therefrom, and an output coupled to said regulating means, said second gating means being responsive to one or more first output signals to generate at said output a first control signal.

6. A power system as defined by claim 5 in which said second gating means is responsive to one or more second output signals only in the absence of first output signals to generate at said output a second control signal.

7. A power system as defined by claim 5 in which each of said overcurrent signal generating means has a first output at which the first overcurrent signal is generated and a second output at which the second overcurrent signal is generated.

8. A power system as defined by claim 7 in which each of said first gating means comprises first, second, third, and fourth logic gates each having first and second inputs and an output, means coupling said first input of each of said first and second logic gates to said first output of the respective overcurrent signal generating means, means coupling said first input of each of said third and fourth logic gates to said second output of the respective overcurrent signal generating means, means coupling said regulating means to said second input of each of said logic gates for supplying a voltage signal inphase with the voltage of the respective output phase of said inverter to said second input of said first and third logic gates and a voltage signal 180° out-of-phase with the voltage of the respective output phase of said inverter to said second input of said second and fourth logic gates, means coupling said output of each of said first and fourth logic gates to said first input of said second gating means, and means coupling said output of each of said second and third logic gates to said second input of said second gating means, said first gating means being responsive to overcurrent and voltage signals to generate first output signals at said outputs of said first and fourth logic gates and second output signals at said outputs of said second and third logic gates.

9. An a-c adjustable speed drive system comprising:
a polyphase a-c motor,
a polyphase inverter for changing unidirectional electric power to polyphase electric power, said conversion means including a plurality of output phases each connected to a respective phase of said motor,
regulating means normally responsive to input signals including a reference signal to regulate the output voltage of said inverter within a range having minimum and maximum levels,
current signal generating means coupled to sense the actual current transmitted in at least a selected one of the phase connections between said inverter and said motor and to generate a current signal proportional thereto,
voltage signal generating means for generating at least one voltage signal in-phase with the voltage of said selected phase connection,
and control signal generating means coupled to said current signal generating means and said voltage signal generating means and being responsive to the current and voltage signals to generate a first control signal in response to a motoring current equal to or greater than a predetermined level and to generate a second control signal in response to a regenerative current equal to or greater than a predetermined level,
said regulating means being coupled to said control signal generating means for receiving control signals therefrom, said regulating means being responsive to a first control signal to substantially instantaneously reduce the output voltage by a single step function to the minimum level of said range and being responsive to a second control signal only in the absence of a first control signal to substantially instantaneously increase the output voltage by a single step function to the maximum level of said range.

10. An a-c adjustable speed drive system as defined by claim 9 in which said regulating means also regulates the output frequency of said inverter, the output frequency being regulated substantially independently of the first and second control signals.

11. An a-c adjustable speed drive system as defined by claim 9 in which said current signal generating means is responsive to the actual current in each of said output phases and generating a respective plurality of current signals, in which said voltage signal generating means generates a plurality of voltage signals each in phase with the voltage of a respective one of said output phases, and in which said control signal generating means is responsive to the current and voltage signals to generate a first control signal in response to a motoring current in any one of said output phases which is equal to or greater than the predetermined level.

12. An a-c adjustable speed drive system as defined by claim 11 in which said control signal generating means is responsive to the current and voltage signals to generate a second control signal in response to a regenerative current in any one of said output phases which is equal to or greater than the predetermined level, said control signal generating means further comprising means responsive to the simultaneous generating of first and second control signals to respond to only the first control signal so as to thereby reduce the output voltage of each of said input phases.

13. An a-c adjustable speed drive system as defined by claim 12 in which said current signal generating means comprises a plurality of current sensing means each coupled to a respective one only of said inverter output pulses and generating a current signal proportional to the actual output current of the respective output phase, and in which said control signal generating means further comprises:
a plurality of overcurrent signal generating means each coupled to a respective one only of said current signal generating means for generating a first overcurrent signal when the actual current is equal to or greater than a fixed positive level and a second overcurrent signal when the actual current is equal to or less than a fixed negative level, a plurality of first gating means each coupled to a respective one only of said overcurrent signal generating means for receiving first and second overcurrent signals therefrom and to said voltage signal generating means for receiving therefrom at least one voltage signal in phase with the respective output phase, each of said first gating means being responsive to the overcurrent and voltage signals supplied thereto to generate a first output signal only when the overcurrent and voltage signals are consistent with motoring operation and to generate a second output signal only when the overcurrent and voltage signals are consistent with regenerative operation, and second gating means having a first input coupled to each of said first gating means for receiving first output signals therefrom, a second input coupled to each of said first gating means for receiving second output signals therefrom, and an output coupled to said regulating means, said second gating means being responsive to one or more first output signals to generate at said output a first control signal.

14. An a-c adjustable speed drive system as defined by claim 13 in which said second gating means is responsive to one or more second output signals only in the absence of first output signals to generate at said output a second control signal.

15. An a-c adjustable speed drive system as defined by claim 14 in which each of said overcurrent signal generating means has a first output at which the first overcurrent signal is generated and a second output at which the second overcurrent signal is generated and in which each of said first gating means comprises first, second, third, and fourth logic gates each having first and second inputs and an output, means coupling said first input of each of said first and second logic gates to said first output of the respective overcurrent signal generating means, means coupling said first input of each of said third and fourth logic gates to said second output of the respective over-current signal generating means, means coupling said regulating means to said second input of each of said logic gates for supplying a voltage signal in-phase with the voltage of the respective output phases of said inverter to said second input of said first and third logic gates and a voltage signal 180° out-of-phase with the voltage of the respective output phase of said inverter to said second input of said second and fourth logic gates, means coupling said output of each of said first and fourth logic gates to said first input of said second gating means, and means coupling said output of each of said second and third logic gates to said second input of said second gating means, said first gating means being responsive to overcurrent and voltage signals to generate first output signals at said outputs of said first and fourth logic gates and second output signals at said outputs of said second and third logic gates.

16. An a-c adjustable speed drive system as defined by claim 15 in which said second gating means comprises a logic network.

17. An a-c adjustable speed drive system as defined by claim 16 in which said second gating means comprises first and second logic gates each having a single output and in which said first and second inputs of said second gating means comprise selected inputs of said first and second logic gates, respectively, and said output of said second gating means comprises the output of said first logic gate, said second gating means further comprising means coupling the output of said second logic gate and an input of said first logic gate.

* * * * *